June 25, 1946.  W. J. KIRKPATRICK  2,402,898
CYMENE PRODUCTION
Filed Jan. 17, 1944
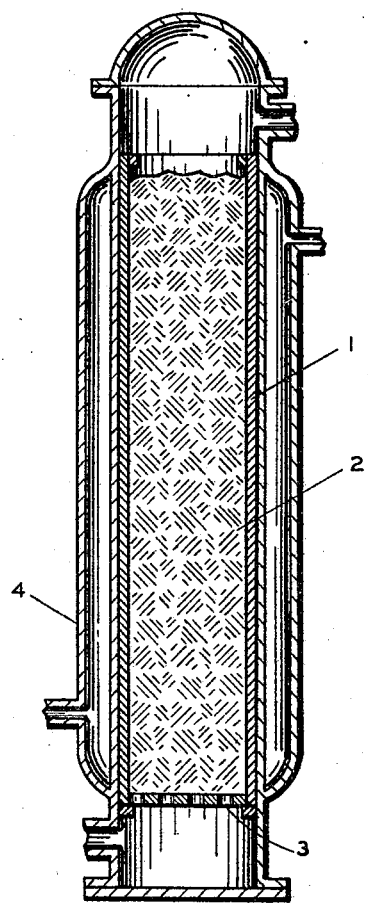
WILLIAM J. KIRKPATRICK
*INVENTOR.*
BY Cleveland B. Hallabaugh
ATTORNEY Patented June 25, 1946

2,402,898

UNITED STATES PATENT OFFICE 2,402,898

CYMENE PRODUCTION

William J. Kirkpatrick, Marshallton, Del., assignor to Hercules Powder Company, Wilmington, Del., a corporation of Delaware Application January 17, 1944, Serial No. 518,533

7 Claims. (Cl. 260—668)

This invention relates to apparatus used in catalytic dehydrogenations and more particularly to an improvement in apparatus for the catalytic dehydrogenation of terpenes.

In the vapor phase dehydrogenation of monocyclic terpenes to para-cymene, vapors of the terpenes are passed through a reaction vessel containing a catalyst at a temperature between about 200° C. and about 400° C. The preferred catalysts are noble metals, such as palladium and platinum, which may be supported on materials such as activated charcoal, alumina, etc.

At the start of the operation, the noble metal catalyst possesses maximum activity but as the reaction proceeds, the activity rapidly diminishes. Thus, in order to maintain a practical degree of efficiency in the process, it is necessary to replace or reactivate the catalyst after a relatively short time.

In accordance with this invention, it has been found that in the dehydrogenation of monocyclic terpenes to cymene with noble metal catalysts, greater economy and efficiency could be effected by increasing the useful life of the catalyst. This is accomplished by employing a catalyst container with surfaces consisting essentially of copper or silver. By this improvement in the process, a five to ten-fold increase in the useful life of the catalyst is obtained. By the term "useful life" is meant that period of activity during which the catalyst may be used without an appreciable decrease in efficiency. As referred to in this invention it means the time required for the activity to decrease from maximum to about 90 percent of maximum.

For the purpose of illustrating the invention, reference is made to the accompanying drawing which consists of a schematic cross-sectional view of a converter of the type which may be employed for dehydrogenation of terpenes to para-cymene.

The converter shown comprises a tubular shell 1, serving to contain the catalyst 2, having a foraminous supporting plate 3 at the bottom and surrounded by a jacket 4 to permit temperature control. The tubular shell and supporting plate, which are in contact with the catalyst, are of copper or silver.

In an example of the practice of this invention, vapors of dipentene were passed through a copper-lined converter, such as shown in the drawing, containing a catalyst of palladium supported on activated charcoal while maintaining the temperature between 290° C. and 310° C. The vapors were passed through the converter at a rate such that the time of contact with the catalyst was about 0.1-0.2 second.

The conversion at the beginning of the run was about 99%. The decrease in catalytic activity was accompanied by a decrease in conversion of 2-3% per 24 hours. A minimum of 92% conversion was arbitrarily chosen as a stopping point at which to effect reactivation of the catalyst.

Additional runs were made at temperatures between 200° C. and 400° C. while maintaining a constant rate of flow of the terpene vapors. Under comparable conditions, runs were also made using a catalyst container having stainless steel surfaces. A useful catalyst life of about 50 to 100 hours was obtained when the surface of the container consisted essentially of copper as compared to 10 to 24 hours when the container was constructed of stainless steel.

In addition to dipentene, other monocyclic terpenes, including terpinolene, alpha-terpinene and gamma-terpinene were employed. Mixtures containing varying amounts of monocyclic terpenes together with other substances such as p-menthane were likewise employed. Although there was some variation in the catalyst life, a high percentage conversion was obtained in all cases. Catalyst life in a copper container was five to ten times that obtained in other normally inert containers.

A catalyst container having essentially copper or silver surfaces may be used to prolong the active life of all noble metal catalysts which are commonly employed in dehydrogenation of terpenes. This invention is therefore applicable to terpene dehydrogenation processes in which catalysts such as platinum, palladium, etc., per se or supported on carriers such as charcoal, alumina, asbestos, and the like, are employed.

What I claim and desire to protect by Letters Patent is:

1. In a process for the preparation of para-cymene from monocyclic terpenes which comprises passing vapors of the terpenes over a palladium catalyst, at a temperature between about 200° C. and about 400° C., the improvement which consists in confining said catalyst in containing walls with surfaces consisting essentially of a metal selected from the group consisting of copper and silver.

2. In a process for the preparation of para-cymene from monocyclic terpenes which comprises passing vapors of the terpenes over a palladium catalyst, at a temperature between about 200° C. and about 400° C., the improvement which consists in confining said catalyst in containing walls with surfaces consisting essentially of copper.

3. A process for preparing para-cymene which comprises passing vapors of monocyclic terpenes over a heated palladium catalyst confined in a container having surfaces consisting essentially of copper.

4. A process for preparing para-cymene which comprises passing vapors of monocyclic terpenes over a palladium catalyst confined in a container having walls consisting essentially of copper at a temperature between about 200° C. and about 400° C.

5. A process for preparing para-cymene which comprises passing vapors of dipentene over a palladium catalyst confined in a container having walls consisting essentially of copper at a temperature between about 200° C. and about 400° C.

6. A process for preparing para-cymene which comprises passing vapors of monocyclic terpenes over a palladium catalyst confined in a container having walls consisting essentially of copper at a temperature between about 280° C. and about 310° C.

7. A process for preparing para-cymene which comprises passing vapors of dipentene over a palladium catalyst confined in a container having walls consisting essentially of copper at a temperature between about 280° C. and about 310° C.

WILLIAM J. KIRKPATRICK.